(12) United States Patent
MacGougan et al.

(10) Patent No.: US 8,738,031 B2
(45) Date of Patent: May 27, 2014

(54) OPERATING GEOGRAPHIC LOCATION SYSTEMS

(75) Inventors: Glenn Donald MacGougan, San Jose, CA (US); Jay N. Bruins, Los Altos, CA (US); Robert Mayor, Half Moon Bay, CA (US); Ronald Keryuan Huang, San Jose, CA (US); Stephen J. Rhee, San Jose, CA (US); Jay L. Prunty, Pleasanton, CA (US); Pejman Lotfali Kazemi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 4 days.

(21) Appl. No.: 13/481,298

(22) Filed: May 25, 2012

(65) Prior Publication Data

US 2013/0316725 A1 Nov. 28, 2013

(51) Int. Cl.
*H04W 24/00* (2009.01)
(52) U.S. Cl.
USPC .............. 455/456.1; 455/456.2; 455/456.3; 455/456.4; 455/456.5; 455/456.6
(58) Field of Classification Search
USPC ........................................ 455/456.1–456.6
See application file for complete search history.

(56) References Cited

U.S. PATENT DOCUMENTS

| | | | |
|---|---|---|---|
| 7,084,758 B1 | 8/2006 | Cole | |
| 7,359,713 B1 | 4/2008 | Tiwari | |
| 7,809,363 B2 * | 10/2010 | Nishida | 455/418 |
| 8,045,236 B2 * | 10/2011 | Karmakar et al. | 358/296 |
| 8,239,864 B2 * | 8/2012 | Imai et al. | 718/100 |
| 2003/0032417 A1 * | 2/2003 | Minear et al. | 455/419 |
| 2005/0026654 A1 * | 2/2005 | Perez et al. | 455/556.2 |
| 2007/0197196 A1 * | 8/2007 | Shenfield et al. | 455/412.2 |
| 2009/0191854 A1 * | 7/2009 | Beason | 455/418 |
| 2010/0041446 A1 * | 2/2010 | Li et al. | 455/574 |
| 2010/0231383 A1 * | 9/2010 | Levine et al. | 340/540 |

(Continued)

FOREIGN PATENT DOCUMENTS

WO    WO 2011/146141 A1    11/2011
WO    WO2013/032502       3/2013

OTHER PUBLICATIONS

Office Action in corresponding Application No. 2013100570, dated Jul. 30, 2013; pp. 1-3.

(Continued)

*Primary Examiner* — Nathan Mitchell
(74) *Attorney, Agent, or Firm* — Fish & Richardson P.C.

(57) ABSTRACT

Among other things, we describe a method that includes receiving, on a mobile device, an indication that an application executing on the mobile device has entered a background state, receiving, from the application, a value indicating a condition for providing location data to the application, disabling a resource associated with the application, while the resource associated with the application is disabled, storing location data received from a location system of the mobile device, and when the condition indicated by the value is met, enabling the resource associated with the application, and providing the stored location data to the application.

26 Claims, 5 Drawing Sheets

(56) References Cited

U.S. PATENT DOCUMENTS

| | | |
|---|---|---|
| 2011/0250871 A1 | 10/2011 | Huang et al. |
| 2011/0250875 A1* | 10/2011 | Huang et al. ............... 455/418 |
| 2011/0256876 A1* | 10/2011 | Kim ............................ 455/445 |
| 2012/0108225 A1* | 5/2012 | Luna et al. ................... 455/418 |
| 2012/0115512 A1 | 5/2012 | Grainger et al. |
| 2012/0289239 A1* | 11/2012 | Luna et al. ................. 455/452.1 |
| 2013/0052965 A1* | 2/2013 | Meylan et al. ................. 455/73 |
| 2013/0053013 A1* | 2/2013 | Giaretta et al. .............. 455/418 |
| 2013/0165181 A1* | 6/2013 | Hasegawa .................. 455/556.1 |
| 2013/0178195 A1* | 7/2013 | Luna et al. ................. 455/414.1 |

OTHER PUBLICATIONS

International Search Report and Written Opinion in corresponding Application No. PCT/US2013/042486, dated Oct. 1, 2013, pp. 1-10.

Response to Examiner's First Report in corresponding AU Application No. 2013100570, dated Nov. 22, 2013; pp. 1-9.

International Search Report with English translation in corresponding Application No.. NL2010850, dated Sep. 20, 2013, 7 pages.

First office action in corresponding Chinese Application No. 201320468297.5, date Oct. 11, 2013, 4 pages.

\* cited by examiner

US 8,738,031 B2

OPERATING GEOGRAPHIC LOCATION SYSTEMS

TECHNICAL FIELD

The disclosure generally relates to operating geographic location systems.

BACKGROUND

A mobile device can include one or more location-based applications that are configured to perform location-specific tasks. A mobile device equipped with a receiver of a global navigation satellite system (GNSS), such as the Global Positioning System (GPS), can use a location determined by the GNSS as an input to a location-based application running on the mobile device. The GNSS receiver can be controlled by a baseband processor on the device which interfaces with an application processor on the device.

SUMMARY

In one aspect, in general, a method includes receiving, on a mobile device, an indication that an application executing on the mobile device has entered a background state, receiving, from the application, a value indicating a condition for providing location data to the application, disabling a resource associated with the application, while the resource associated with the application is disabled, storing location data received from a location system of the mobile device, and when the condition indicated by the value is met, enabling the resource associated with the application, and providing the stored location data to the application.

In another aspect, a computer program product stored on a storage device and configured to cause a mobile device to perform operations includes receiving, on a mobile device, an indication that an application executing on the mobile device has entered a background state, receiving, from the application, a value indicating a condition for providing location data to the application, disabling a resource associated with the application, while the resource associated with the application is disabled, storing location data received from a location system of the mobile device, and when the condition indicated by the value is met, enabling the resource associated with the application, and providing the stored location data to the application.

Implementations of these aspects may include one or more of the following features. The condition indicated by the value includes a time at which to enable the resource. The condition indicated by the value includes a distance traveled at which to enable the resource. The resource associated with the application is a component of the mobile device. The component of the mobile device is an application processor of the mobile device. The location data received from the location system of the mobile device is stored by a baseband processor of the mobile device. The aspect includes providing, to the baseband processor, the value indicating the condition for providing location data to the application. Disabling a resource associated with the application includes placing the application into a pause state. The aspect includes receiving, on the mobile device, an indication that the application executing on the mobile device has entered a foreground state, and providing the stored location data to the application. The aspect includes receiving, at the baseband processor from the application executing on the mobile device, an indication to provide the stored location data to the application, and providing the stored location data to the application.

In general, in another aspect, a mobile device includes a location system configured to determine a current location of the mobile device, an application processor configured to operate in a low-power state and configured to operate in a full-power state, and a baseband processor configured to receive and store location data from the location system of the mobile device when the application processor is in the low-power state and configured to provide the stored location data to the application processor when the application processor is in a full-power state.

Implementations of this aspect may include one or more of the following features. The application processor is configured to enter the full-power state after a period of time of operation in the low-power state, the period of time defined by a condition value. The condition value specifies the period of time. The condition value specifies a distance traveled at which to enter the full-power state. The application processor is configured to provide the condition value to the baseband processor. The baseband processor is configured to provide an indication to the application processor to exit the low-power state and enter the full-power state.

Particular implementations provide at least the following advantages. A mobile device can conserve battery power by powering down a GNSS receiver when the mobile device is not moving.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Some mobile devices, such as smartphones, can run applications that use a location system such as a global positioning system (GPS) receiver. Location applications that use GPS functionality can indicate information to a user of the smartphone such as where he is, where he has been, what direction he is traveling, how fast he is traveling, and other location information. Some smartphones allow a user to place applications into a background state, such that the application will continue to run but will not be visible to the user unless the user brings the application back to the foreground. While in the background state, a location application can continue to use the GPS receiver to collect data.

When a location application is in a background state and not visible to a user, the location application may not need to process GPS receiver data in real time. Instead, GPS receiver data could be stored in a queue for a period of time and then released. Further, to save battery power, the location application could be paused and a processor running the location application could be powered down during the period of time. For example, a processor running a fitness application could be powered down until a time at which the fitness application provides a spoken running distance update to a user of the smartphone.

Figure 1:
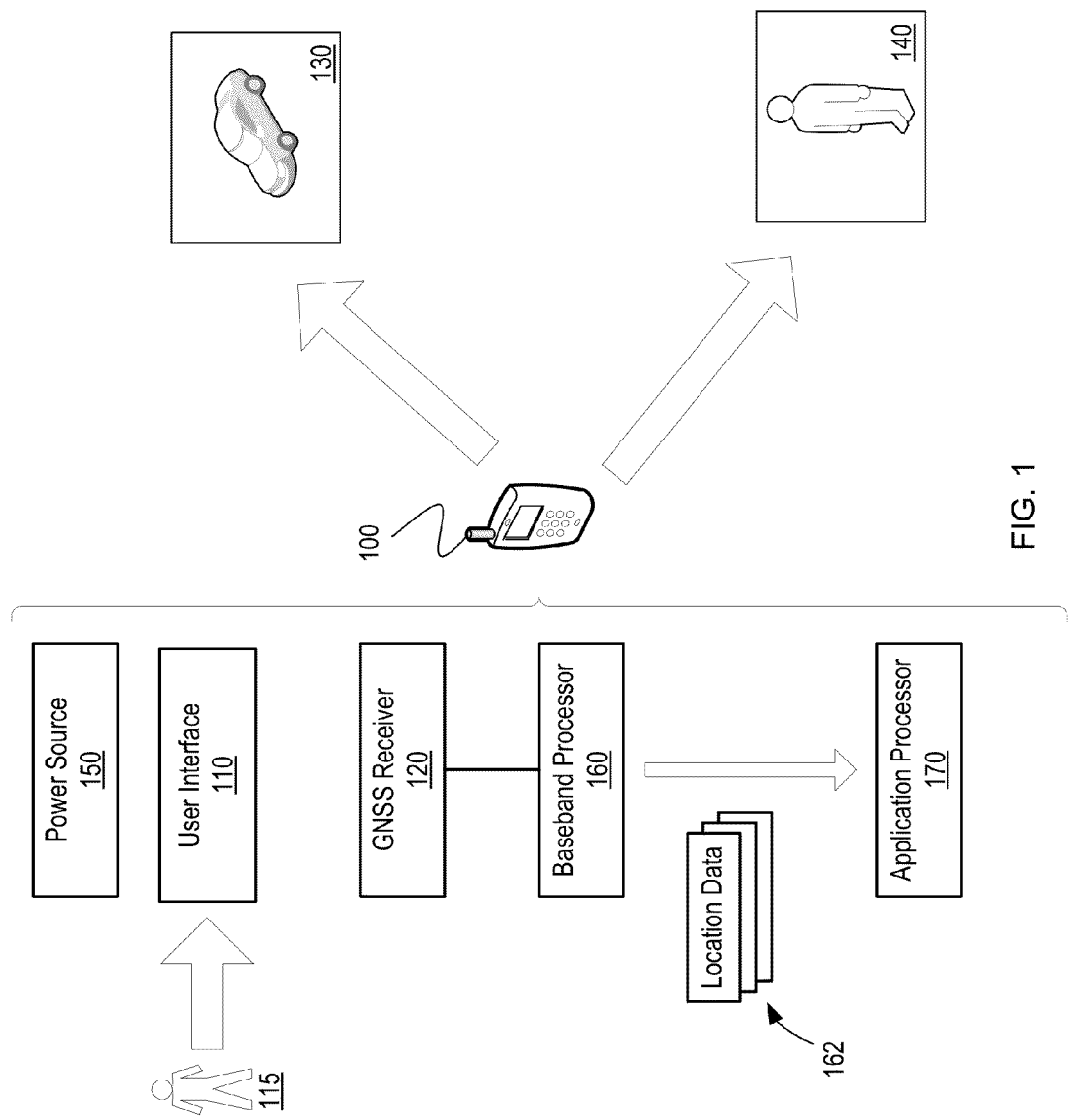
FIG. 1 is a block diagram of a mobile device and related components.

FIG. 1 shows an example of a mobile device 100 (e.g., a wireless mobile device) that runs location-aware applications. The mobile device has a user interface 110 that allows a user 115 such as a human operator of the mobile device 100 to interact with applications that execute on the mobile device. Applications are collections of program code that is executable by computer system components of the mobile device 100. For example, the mobile device 100 can have an application processor 170 that executes the applications. The application processor 170 may be a single component such as a microprocessor, microcontroller, or ASIC (application-specific integrated circuit), or the application processor 170 may be a combination of these kinds of components or other components, or the application processor 170 could be a subcomponent of another component (e.g., the application processor 170 could be a portion of a microprocessor). In some implementations, the application processor 170 can operate in a full-power mode, sometimes called an active mode or active state, and the application processor 170 can operate in a low-power mode, sometimes called a deactivated mode or a deactivated state. When the application processor 170 operates in a deactivated state, some or all of the functionality of the application processor 170 may be disabled.

The applications can be stored in a data storage facility of the mobile device 100, for example, solid state memory, flash memory, or another kind of data storage. When an application is executed (e.g., after the mobile device 100 receives an indication from the user 115 to execute a particular application), the program code of the application is executed on the mobile device. An application that has program code executing on a mobile device 100 can be said to be running on the mobile device 100.

Some applications are location applications. A location application is an application that uses information about the location of the mobile device 100. The information about the location of the mobile device 100 can be collected once or it can be collected over a period of time. One example of a location application is an automobile navigation application 130. An automobile navigation application 130 can display navigation data on the user interface 110. For example, the navigation data can indicate a current location of the mobile device 100 (and thus a current location of an automobile containing the mobile device), or the navigation data can indicate a path from a source location to a destination location, such as streets and highways to traverse, or the navigation data can indicate other information based on a current location of the mobile device 100. Another example of a location application is a personal fitness application 140. A personal fitness application 140 can display information on the user interface 110 that a user (such as the user 115) can use in personal fitness activities. For example, if the user is running along a running path, the personal fitness application 140 can indicate data such as the user's current location, current running speed, or other information determined based on the location of the mobile device 100 over time. In some examples, the personal fitness application 140 records data such as data about the user's average running speed over one activity or over multiple activities such as multiple running sessions.

Location information used by a location application can be received from a GNSS receiver 120. The GNSS receiver 120 determines a physical location of the mobile device 100, e.g., expressed as longitude and latitude. In some examples, the GNSS receiver 120 determines a physical location of the mobile device 100 by receiving data from satellites in orbit of the earth and calculating a location based on the received data. In use, the GNSS receiver 120 draws power from a power source 150 of the mobile device 100. For example, the power source 150 can be a battery such as a lithium-ion battery.

The GNSS receiver 120 is in communication with a baseband processor 160. Among other things, the baseband processor 160 calculates location data based on signals received at the GNSS receiver 120. The baseband processor 160 may be a single component such as a microprocessor, microcontroller, or ASIC (application-specific integrated circuit), or the baseband processor 160 may be a combination of these kinds of components or other components, or the baseband processor 160 could be a subcomponent of another component (e.g., the baseband processor 160 could be a portion of a microprocessor). The baseband processor 160 can operate independently of the application processor 170. For example, the application processor 170 need not be in an active state for the baseband processor 160 to communicate with the GNSS receiver.

In use, the baseband processor 160 calculates location data 162 based on signals received at the GNSS receiver 120 and provides the location data 162 to the application processor 170. For example, the location data 162 can be provided to the application processor 170 for use by a location application such as the automobile navigation application 130 or the personal fitness application 140.

The user interface 110 may be an example of one or more Graphical User Interfaces (UIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers "to select" or "selecting" or "invoking" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

Figure 2:
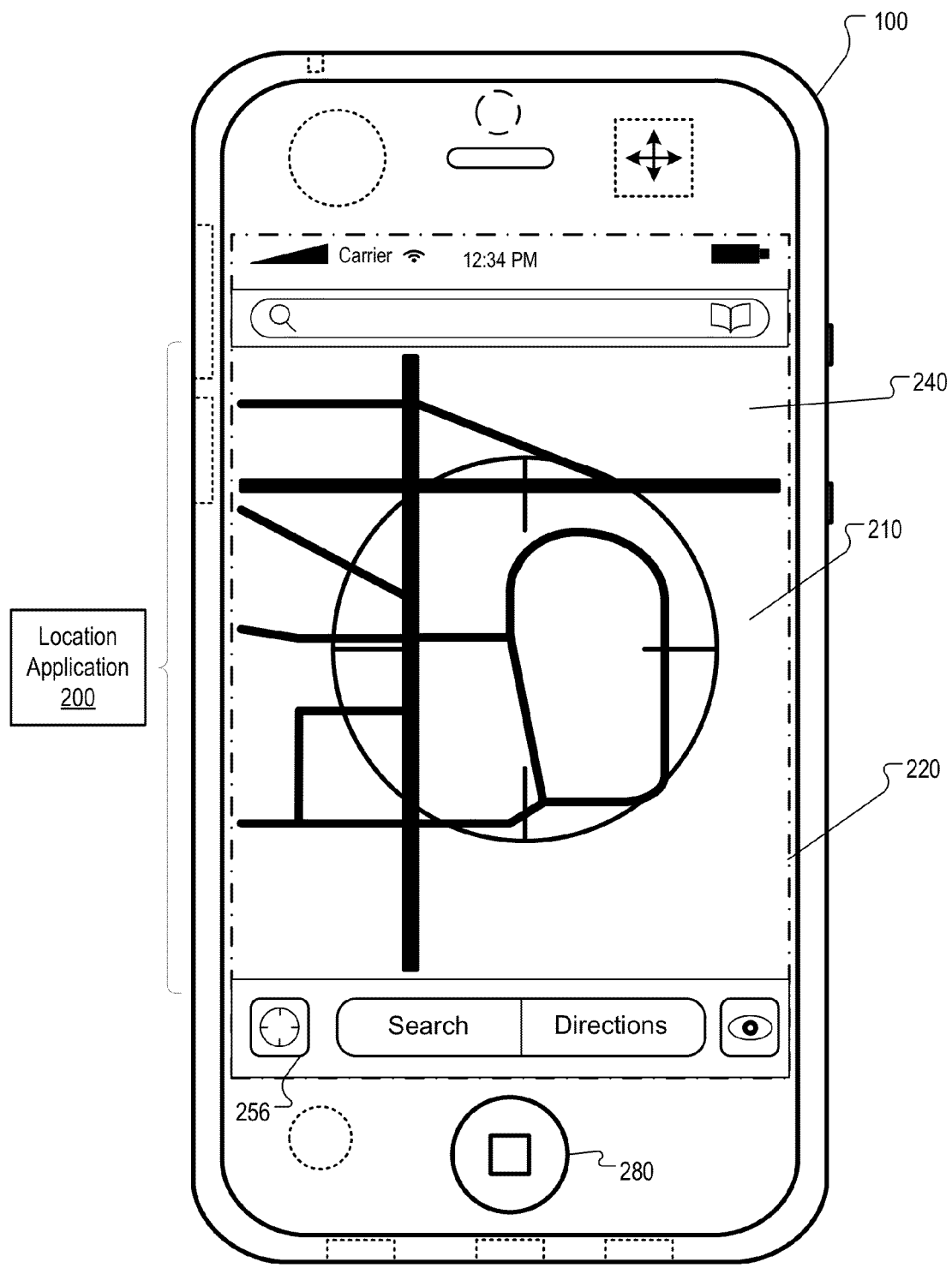
FIG. 2 illustrates an exemplary user interface displaying a location application.

FIG. 2 is an exemplary user interface 210 of the mobile device 100. The user interface 210 could be an example of the user interface 110 shown in FIG. 1. The mobile device 100 can include a touch sensitive display device 220 with which a user of the mobile device 100 can interact with the user interface 210.

The user interface 210 may include user interface elements of a location application 200 running on the mobile device 100. The location application 200 can be an example of one of the location applications 130, 140 shown in FIG. 1. In some examples, the user interface 210 displays data such as data describing the location of the mobile device (e.g., data that can be used for navigation), data chosen based on a location of the mobile device (e.g., data describing nearby points of interest), or other kinds of data to which location is relevant.

In the example shown in FIG. 2, the location application 200 displays a map 240 of a geographic area on the touch sensitive display device 220. The location application 200 can display the map 240 based on information received from the GNSS receiver 120 shown in FIG. 1. In some examples, the location application 200 displays a map 240 representing the geographic area surrounding the physical location of the mobile device 100. For example, if a user of the mobile devices invokes a current location object 256 (e.g., if a user presses on the touch sensitive display device 220 at the location of the current location object 256), the location application 200 can acquire the geographic location of the mobile device 100 from the GNSS receiver 120. The location application 200 also retrieves map data describing the geographic area surrounding the current geographic location (e.g., from data storage of the mobile device 100, from a geographic data server accessible using a network such as the Internet, or from another source of geographic data). Once the geographic location of the mobile device 100 has been acquired and the map data has been retrieved, the location application 200 can display the map 240 of the current geographic location of the mobile device 100. In some implementations, the location application 200 displays an indication of the location of the mobile device 100. For example, the location application 200 may display a marker indicating the precise location of the location of the mobile device 100.

In some implementations, the location application 200 can enter a background state. When an application is in a background state, the application is running on the mobile device 100 but may display no user interface elements or may display fewer user interface elements than are usually displayed when the application is not in a background state. When the application is not in a background state, the application can be said to be running in a foreground state. For example, the location application 200 may display a map 240 when the location application 200 is in a foreground state but does not display the map 240 when the location application 200 is in a background state. In some implementations, a user can switch the location application 200 from a foreground state to a background state by invoking a user interface element. For example, the location application 200 may switch from a foreground state to a background state when a user presses a home key 280 of the mobile device 100. In some implementations, the location application 200 may switch from a foreground state to a background state after a period of inactivity or in response to some other trigger event. For example, if a user has not interacted with the user interface 210 of the location application after a period of time, the location application 200 may switch to a background state. In some examples, the location application 200 can return to the foreground state from the background state when a user invokes a user interface element of the mobile device 100. For example, if the user selects the location application 200 from a list of applications running in a background state on the mobile device 100, the location application returns to a foreground state.

In some examples, the location application 200 makes use of location data received from the GNSS receiver 120 when the location application 200 is in a background state. If the location application 200 is an automobile navigation application, the location application 200 may be used to provide navigation directions to a user who is driving an automobile. For example, a user of the mobile device 100 may have entered directions from a source location to a destination location using the directions object 254. Further, the location application 200 may be configured to provide information to the user while the location application 200 is in a background state. For example, the location application 200 may use an audio output facility of the mobile device 100, such as a speaker, to provide spoken word directions (e.g., "turn left," "exit highway"). Thus, the location application 200 receives location data when the location application 200 is in a background state and the location application 200 is not displaying the map 240 or other elements of the user interface 210. Accordingly, the GNSS receiver 120 may remain active even when applications using the GNSS receiver 120 are not in the foreground. A location application 200 in a background state may not need to receive location data as frequently as when the location application 200 is in a foreground state. For example, a navigation application in a background state may not need to update a map on the user interface but still may provide spoken word directions at various times.

Further, in some examples, an application processor executing the location application 200 (e.g., the application processor 170 shown in FIG. 1) may be in a deactivated state when the location application 200 is in the background. For example, if no other applications are running in a foreground state on the mobile device 100 then the mobile device 100 may deactivate the application processor. The location application 200 temporarily ceases execution on the application processor 170 when the application processor 170 is in a deactivated state. When the location application 200 temporarily ceases execution, the location application 200 can be said to be in a pause state. Because the application processor 170 draws power from the mobile device 100, the mobile device 100 can conserve stored power if the application processor 170 is powered down and the location application 200 enters a pause state.

If the application processor 170 is in a deactivated state, the application processor 170 may not be able to receive location data from the GNSS receiver 120 (FIG. 1). Location data can be stored on behalf of the application processor 170 while the application processor 170 is in a deactivated state. When the application processor 170 is reactivated, the location data can be provided to the application processor 170. In this way, a location application 200 that has entered a pause state can be provided information that describes the location of the mobile device 100 at points in time at which the application processor 170 was in a deactivated state and at which the location application 200 was unable to receive location data for processing. For example, if a personal fitness application was paused while a user was running while carrying the mobile device 100, the personal fitness application could determine the path of the user's travel while the personal fitness application was paused based on the information the personal fitness application receives once it begins executing again.

Figure 3:
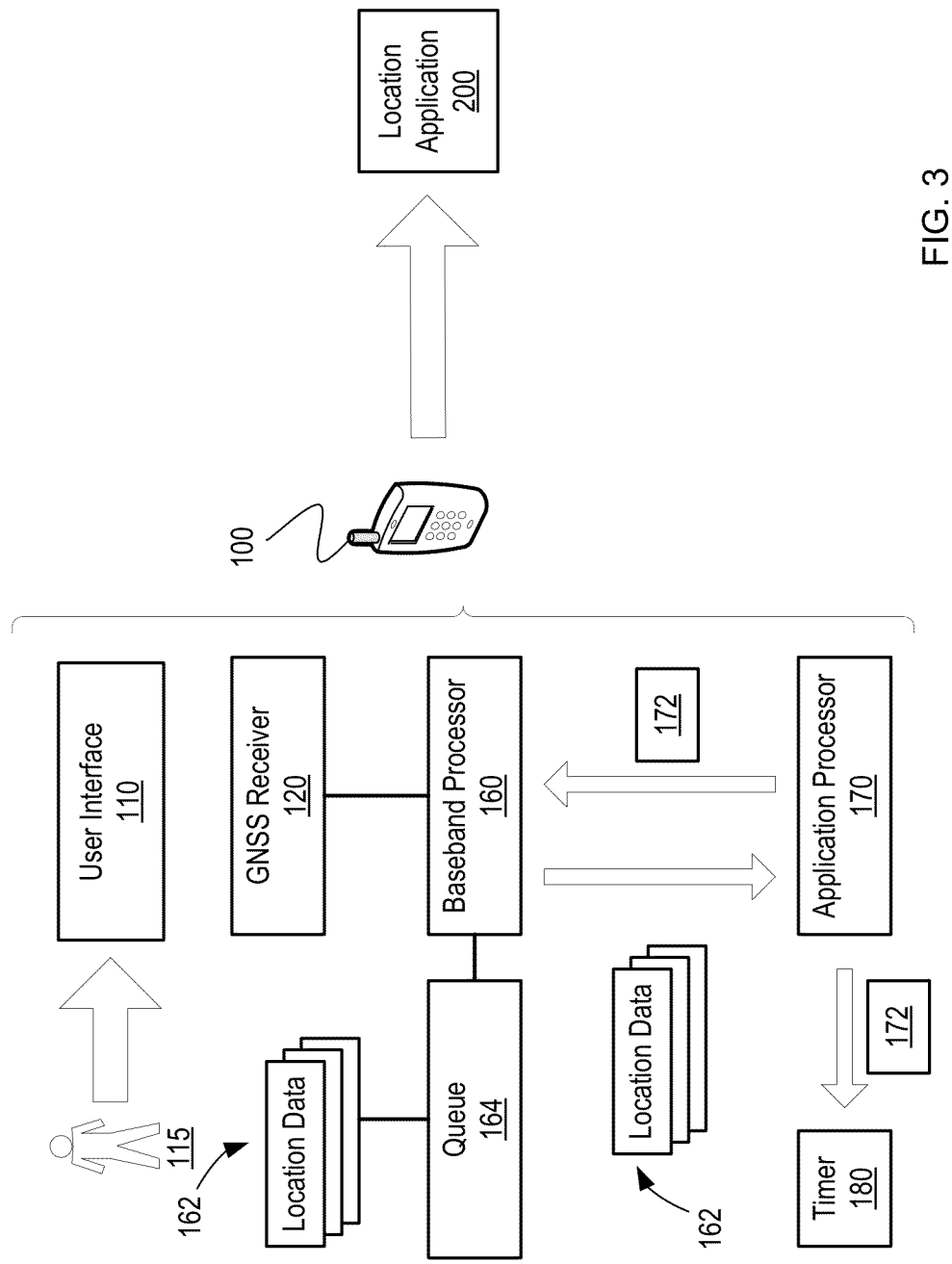
FIG. 3 shows an example of a mobile device configured to store location data on behalf of a deactivated application processor.

FIG. 3 shows an example of a mobile device 100 configured to store location data on behalf of a deactivated application processor 170. In some implementations, the baseband processor 160 is configured to store location data 162 on behalf of the application processor 170. For example, the baseband processor 160 can be configured to store location data 162 while the application processor 170 is operating in a deactivated state.

In use, the application processor 170 can enter a deactivated state, for example, when a location application 200 enters a background state. The application processor 170 can also notify the baseband processor 160 that the application processor 170 is entering a deactivated state. In response, the baseband processor 160 can begin storing location data 162 on behalf of the application processor.

In some implementations, the baseband processor 160 has a queue 164 in which to store the location data 162. For example, the queue 164 can be a storage device, such as a solid state memory device or another kind of storage device. In some examples, the queue 164 may be integrated with the baseband processor 160. For example, the baseband processor 160 could be an integrated circuit, and the queue 164 could be a component of the integrated circuit.

When the application processor 170 exits the deactivated state, the baseband processor 160 can provide some or all of the location data 162 stored in the queue 164 to the application processor 170. The location data 162 may include multiple elements of data. The quantity of data depends on the amount of time in which the baseband processor 160 stores the location data 162. For example, if the baseband processor 160 calculates location data once every second (i.e., at a rate of one hertz), and the baseband processor then stores location data 162 in the queue 164 over the course of sixty seconds, then the location data 162 will include sixty elements of location data. Each element represents the location of the mobile device 100 at the instant at which the element of location data 162 was determined.

A condition value 172 can be used to indicate a condition for providing location data 162 to the application processor 170. When a condition indicated by the condition value 172 is met, the baseband processor 160 can provide the location data 162 stored in the queue 164 to the application processor. For example, the condition value 172 may indicate a time at which the location data 162 should be provided to the application processor 170. As another example, the condition value 172 may indicate a distance traveled, such that when the mobile device 100 has physically traveled the specified distance (e.g., as determined by the baseband processor 160 based on signals received at the GNSS receiver 120), the location data 162 will be provided to the application processor 170. The condition value 172 could also include indications for both kinds of conditions and could also indicate other kinds of conditions. In some implementations, the application processor 170 provides the condition value 172 to a component of the mobile device 100.

In some examples, the application processor 170 can provide the condition value 172 to the baseband processor 160, e.g., before the application processor 170 enters a deactivated state or concurrently when the application processor 170 enters a deactivated state. For example, if the condition value 172 indicates a distance traveled, then the baseband processor 160 can determine when the mobile device 100 has traveled the specified distance in the time in which the application processor 170 is in a deactivated state. When the baseband processor 160 determines that the mobile device 100 has traveled the specified distance, the baseband processor 160 can activate the application processor 170, e.g., by transmitting an interrupt signal or other communication to the application processor 170.

In some examples, the application processor 170 can provide the condition value 172 to a timer 180, e.g., before the application processor 170 enters a deactivated state or concurrently when the application processor 170 enters a deactivated state. The timer 180 may be a component of the mobile device 100 that can provide a signal to the application processor 170 after a specified period of time. In some examples, the timer 180 is a component separate from the application processor 170. In some examples, the timer 180 is a component of the application processor 170 that remains active when the application processor 170 is in a deactivated state. When a timer 180 is used, the condition value 172 may indicate an amount of time in which the baseband processor 160 should store data on behalf of the application processor 170. For example, if the application processor 170 will remain in the deactivated state for sixty seconds, the condition value 172 can indicate a time of sixty seconds to the timer 180. When the timer 180 determines that the amount of time indicated by the condition value 172 has elapsed, the application processor 170 can be activated. For example, the timer 180 can transmit an interrupt signal or other communication to the application processor 170. The application processor 170 can then receive location data 162 from the baseband processor 160.

In some implementations, the condition value 172 can represent multiple periods of time in which the application processor 170 will operate in a deactivated state. For example, the application processor 170 may exit the deactivated state every sixty seconds to collect location data 162 from the baseband processor 160 and then re-enter the deactivated state. The condition value 172 can indicate that the sixty seconds of deactivation will occur on an ongoing basis until the application processor 170 indicates otherwise, e.g., to the timer 180.

When the application processor 170 exits the deactivated state and receives the location data 162, the location data 162 can be provided to the location application 200 for the location application 200 to processes. For example, the location application can determine which locations the mobile device 100 has been present at even while the application processor 170 was in a deactivated state.

In some implementations, a user 115 of the mobile device can cause the application processor 170 to exit the deactivated state. For example, if the user 115 indicates on the user interface 110 that the location application 200 should exit a background state and enter a foreground state, the application processor 170 can enter an active state so that the location application 200 can exit a pause state and begin executing. When the user 115 indicates on the user interface 110 that the location application 200 should exit a background state and enter a foreground state, the baseband processor 160 can also provide the location data 162 stored in the queue 164 to the application processor 170.

Figure 4:
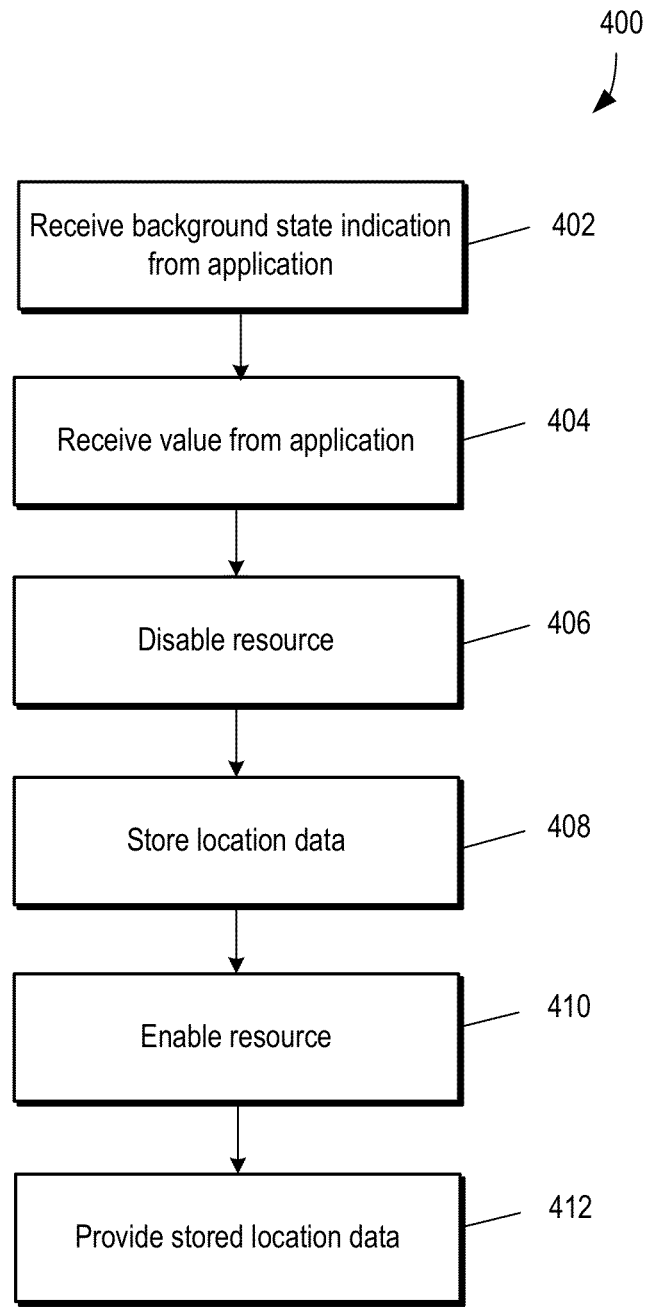
FIG. 4 is a flowchart of an exemplary process of operating a geographic location system.

FIG. 4 is flow diagram of an exemplary process 400 for operating location systems. The process 400 can be performed, for example, by the mobile device 100 shown in FIG. 1.

An indication that an application executing on the wireless mobile device has entered a background state can be received (402). For example, a user of the mobile device 100 may have indicated on a user interface that the application should enter a background state. The application can be a location application that uses location data provided by a GNSS receiver.

A value indicating a condition for providing location data to the application can be received (404). For example, the condition may be indicated in the form of a time value provided by the application. The time value may indicate the amount of time in which the application processor of the mobile device will be operating in a deactivated state. As another example, the condition may be indicated in the form of a distance traveled after which the application processor should be re-activated and location data provided to the application processor.

A resource associated with the application can be disabled (406). In some examples, the resource can be a component of the mobile device. For example, the resource may be an application processor that executes the application. The resource can be disabled to conserve power on the mobile device. In some examples, the application can be placed into a pause state (e.g., by the application processor or the baseband processor) when the resource is disabled. In some examples, the application processor self-disables. In some examples, the baseband processor disables the application processor, e.g., by communication a signal to disable.

Location data received from a location system of the mobile device can be stored (408). The location data is stored while the resource associated with the application is disabled. In some implementations, a baseband processor of the mobile device stores the location data while the resource is disabled. For example, the baseband processor may have a queue or other data structure or storage device in which to store location data while the resource is disabled. The baseband processor may be provided the condition value and store location data until the condition indicated by the condition value is met.

The resource associated with the application can be enabled (410). The resource can be enabled when a condition indicated by the condition value is met. For example, if the application is a location application and the resource is an application processor, the application processor can enter an active state and the location application can perform executable operations on the application processor. In some examples, the application processor self-enables, e.g., after an internal timer triggers a command to enable. A timer external to the application processor could also be used. In some examples, the baseband processor enables the application processor, e.g., by communicating a signal to enable.

In some examples, the resource can be enabled when the application enters a foreground state. For example, if a user of the mobile device brings the application into a foreground state, the resource (e.g., the application processor) is enabled. The enabling of the resource can occur independent of a condition indicated by the condition value. In some examples, an application can indicate to the baseband processor to provide the location data to the application processor. For example, the application may already be in a foreground state, but the location data has not yet been received from the baseband processor.

The stored location data can be provided to the application (412). The data can be provided when a condition indicated by the condition value is met, for example, once the resource is enabled. In some examples, the data is provided when the application enters a foreground state. The application can then process the location data. For example, the application can use the location data to determine locations at which the mobile device was present while the resource (e.g., application processor) was disabled, as described in reference to FIG. 2.

Figure 5:
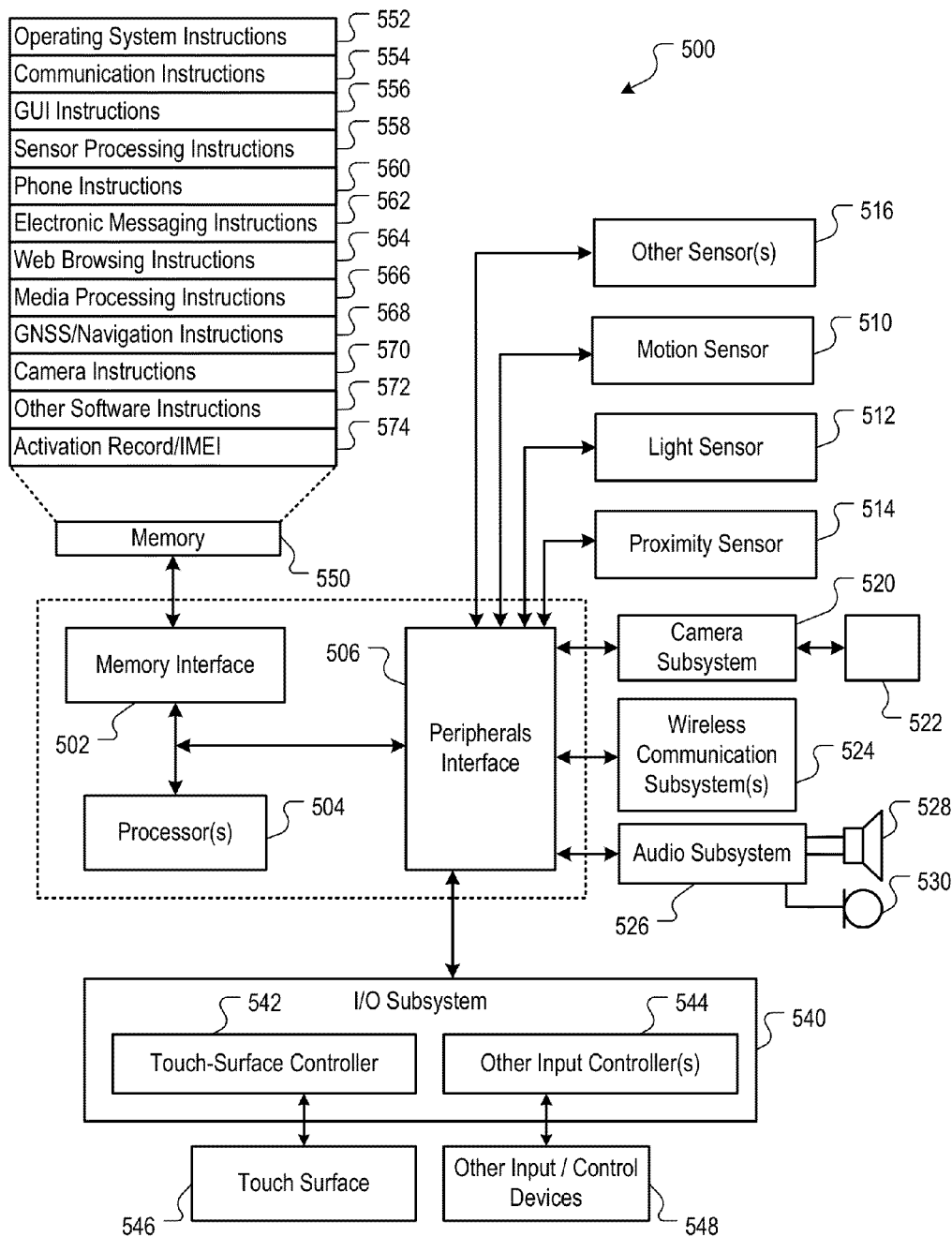
FIG. 5 is a block diagram of an exemplary system architecture implementing the features and processes of FIGS. 1-4.

FIG. 5 is a block diagram of an example computing device 500 that can implement the features and processes of FIGS. 1-4. The computing device 500 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. The various components in the computing device 500 can be coupled by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate orientation, lighting, and proximity functions. Other sensors 516 can also be connected to the peripherals interface 506, such as a global navigation satellite system (GNSS) (e.g., GPS receiver), a temperature sensor, a biometric sensor, or other sensing device, to facilitate related functionalities. In some examples, the motion sensor 510 is an accelerometer. For example, the motion sensor 510 may detect acceleration of the computing device 500, speed of motion of the computing device 500, and other values indicative of the movement of the computing device 500.

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips. The camera subsystem 520 and the optical sensor 522 can be used to collect images of a user to be used during authentication of a user, e.g., by performing facial recognition analysis.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the computing device 500 is intended to operate. For example, the computing device 500 can include communication subsystems 524 designed to operate over a GSM network, a GPRS network, an EDGE network, a Wi-Fi or WiMax network, and a Bluetooth™ network. In particular, the wireless communication subsystems 524 can include hosting protocols such that the device 500 can be configured as a base station for other wireless devices.

An audio subsystem 526 can be coupled to a speaker 528 and a microphone 530 to facilitate voice-enabled functions, such as speaker recognition, voice replication, digital recording, and telephony functions. The audio subsystem 526 can be configured to facilitate processing voice commands, voice-printing and voice authentication. In some implementations, audio recorded by the audio subsystem 526 is transmitted to an external resource for processing. For example, voice commands recorded by the audio subsystem 526 may be transmitted to a network resource such as a network server which performs voice recognition on the voice commands.

The I/O subsystem 540 can include a touch-surface controller 542 and/or other input controller(s) 544. The touch-surface controller 542 can be coupled to a touch surface 546. The touch surface 546 and touch-surface controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration can disengage a lock of the touch surface 546; and a pressing of the button for a second duration that is longer than the first duration can turn power to the computing device 500 on or off. Pressing the button for a third duration can activate a voice control, or voice command, module that enables the user to speak commands into the microphone 530 to cause the device to execute the spoken command. The user can customize a functionality of one or more of the buttons. The touch surface 546 can, for example, also be used to implement virtual or soft buttons and/or a keyboard.

In some implementations, the computing device 500 can present recorded audio and/or video files, such as MP3, AAC, and MPEG files. In some implementations, the computing device 500 can include the functionality of an MP3 player. Other input/output and control devices can also be used.

The memory interface 502 can be coupled to memory 550. The memory 550 can include high-speed random access memory and/or non-volatile memory, such as one or more magnetic disk storage devices, one or more optical storage devices, and/or flash memory (e.g., NAND, NOR). The memory 550 can store an operating system 552, such as Darwin, RTXC, LINUX, UNIX, OS X, WINDOWS, or an embedded operating system such as VxWorks.

The operating system 552 can include instructions for handling basic system services and for performing hardware dependent tasks. In some implementations, the operating system 552 can be a kernel (e.g., UNIX kernel). In some implementations, the operating system 552 can include instructions for performing voice authentication. For example, operating system 552 can implement the security lockout and voice authentication features. Operating system 552 can implement the voiceprint and voice authentication features.

The memory 550 can also store communication instructions 554 to facilitate communicating with one or more additional devices, one or more computers and/or one or more servers. The memory 550 can include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions, such as the process described in reference to FIG. 4; and/or camera instructions 570 to facilitate camera-related processes and functions.

The memory 550 can store other software instructions 572 to facilitate other processes and functions, such as the security and/or authentication processes and functions. For example, the software instructions can include instructions for performing voice authentication on a per application or per feature basis and for allowing a user to configure authentication requirements of each application or feature available on device 500.

The memory 550 can also store other software instructions (not shown), such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively. An activation record and International Mobile Equipment Identity (IMEI) 574 or similar hardware identifier can also be stored in memory 550.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the computing device 500 can be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims. For example, rather than disabling a location system, the mobile device can disable or pause a location application running on the mobile device based on an indication that an activity associated with the location application (e.g., running or driving in an automobile) is no longer taking place.

What is claimed is:

1. A method comprising:
   receiving, on a mobile device, an indication that an application executing on the mobile device has entered a background state;
   receiving, from the application, a value indicating a condition for providing location data to the application;
   disabling a resource associated with the application;
   while the resource associated with the application is disabled, storing location data received from a location system of the mobile device; and
   when the condition indicated by the value is met, enabling the resource associated with the application, and providing the stored location data to the application.

2. The method of claim 1, wherein the condition indicated by the value comprises a time at which to enable the resource.

3. The method of claim 1, wherein the condition indicated by the value comprises a distance traveled at which to enable the resource.

4. The method of claim 1, wherein the resource associated with the application is a component of the mobile device.

5. The method of claim 4, wherein the component of the mobile device is an application processor of the mobile device.

6. The method of claim 1, wherein the location data received from the location system of the mobile device is stored by a baseband processor of the mobile device.

7. The method of claim 6, comprising providing, to the baseband processor, the value indicating the condition for providing location data to the application.

8. The method of claim 1, wherein disabling a resource associated with the application comprises placing the application into a pause state.

9. The method of claim 1, comprising
   receiving, on the mobile device, an indication that the application executing on the mobile device has entered a foreground state; and
   providing the stored location data to the application.

10. The method of claim 6, comprising
    receiving, at the baseband processor, from the application executing on the mobile device, an indication to provide the stored location data to the application; and
    providing the stored location data to the application.

11. A computer readable storage device storing a computer program product configured to cause a mobile device to perform operations comprising:
    receiving, on a mobile device, an indication that an application executing on the mobile device has entered a background state;
    receiving, from the application, a value indicating a condition for providing location data to the application;
    disabling a resource associated with the application;
    while the resource associated with the application is disabled, storing location data received from a location system of the mobile device; and
    when the condition indicated by the value is met, enabling the resource associated with the application, and providing the stored location data to the application.

12. The computer readable storage device of claim 11, wherein the condition indicated by the value comprises a time at which to enable the resource.

13. The computer readable storage device of claim 11, wherein the condition indicated by the value comprises a distance traveled at which to enable the resource.

14. The computer readable storage device of claim 11, wherein the resource associated with the application is a component of the mobile device.

15. The computer readable storage device of claim 14, wherein the component of the mobile device is an application processor of the mobile device.

16. The computer readable storage device of claim 11, wherein the location data received from the location system of the mobile device is stored by a baseband processor of the mobile device.

17. The computer readable storage device of claim 16, comprising providing, to the baseband processor, the value indicating the condition for providing location data to the application.

18. The computer readable storage device of claim 11, wherein disabling a resource associated with the application comprises placing the application into a pause state.

19. The computer readable storage device of claim 11, the operations comprising
    receiving, on the mobile device, an indication that the application executing on the mobile device has entered a foreground state; and
    providing the stored location data to the application.

20. The computer readable storage device of claim 16, the operations comprising
    receiving, at the baseband processor, from the application executing on the mobile device, an indication to provide the stored location data to the application; and
    providing the stored location data to the application.

21. A mobile device comprising:
    a location system configured to determine a current location of the mobile device;
    an application processor configured to operate in a low-power state and configured to operate in a full-power state; and
    a baseband processor configured to receive and store location data from the location system of the mobile device when the application processor is in the low-power state and configured to provide the stored location data to the application processor when the application processor is in a full-power state.

22. The mobile device of claim 21, wherein the application processor is configured to enter the full-power state after a period of time of operation in the low-power state, the period of time defined by a condition value.

23. The mobile device of claim 22, wherein the condition value specifies the period of time.

24. The mobile device of claim 22, wherein the condition value specifies a distance traveled at which to enter the full-power state.

25. The mobile device of claim 22, wherein the application processor is configured to provide the condition value to the baseband processor.

26. The mobile device of claim 21, wherein the baseband processor is configured to provide an indication to the application processor to exit the low-power state and enter the full-power state.

* * * * *